(12) United States Patent
Liow et al.

(10) Patent No.: US 7,556,228 B2
(45) Date of Patent: Jul. 7, 2009

(54) APPARATUS FOR SECURE PLACEMENT ON A FLAT SURFACE AND A METHOD THEREOF

(75) Inventors: Yuen Khim Joseph Liow, Singapore (SG); Siang Thia Goh, Singapore (SG); Jun Zhu, Singapore (SG)

(73) Assignee: Creative Technology Ltd, Singapore (SG)

( * ) Notice: Subject to any disclaimer, the term of this patent is extended or adjusted under 35 U.S.C. 154(b) by 0 days.

(21) Appl. No.: 11/546,762

(22) Filed: Oct. 12, 2006

(65) Prior Publication Data
US 2008/0087779 A1    Apr. 17, 2008

(51) Int. Cl.
*A47G 1/17* (2006.01)

(52) U.S. Cl. .................. 248/206.5; 248/309.4; 248/500

(58) Field of Classification Search .............. 248/206.5, 248/207, 683, 500, 309.4, 346.5
See application file for complete search history.

(56) References Cited

U.S. PATENT DOCUMENTS

| | | | | |
|---|---|---|---|---|
| 6,042,080 | A | * | 3/2000 | Shepherd et al. ............ 248/683 |
| 7,100,884 | B2 | * | 9/2006 | Lorber ........................ 248/453 |
| 2004/0118985 | A1 | * | 6/2004 | Omps ........................ 248/181.1 |
| 2005/0247845 | A1 | * | 11/2005 | Li et al. ..................... 248/346.5 |
| 2007/0200038 | A1 | * | 8/2007 | Dautrey .................... 248/206.5 |

OTHER PUBLICATIONS

Amazon.com web site featuring Apple iSight Video Conferencing Webcam with Autofocus for sale, Date first available for sale on Amazon: Feb. 23, 2005, 5 pages.
Apple.com web site information page featuring iSight Webcam, printed on Nov. 20, 2006.

* cited by examiner

*Primary Examiner*—Ramon O Ramirez

(57) ABSTRACT

There is provided an apparatus for secure placement on a substantially flat surface. The apparatus includes a case; at least one support piece located on the substantially flat surface for placement of the case, the support piece including at least one piece of a first material; and at least one piece of a second material located within the case. The case rotates about an axis when a facing/bearing of the apparatus is changed. The axis may be either horizontal or vertical. Preferably, at least one of the first material and the second material is a magnet for magnetic attraction between the at least one piece of the first material and the at least one piece of the second material. The apparatus may be a web camera, a set of speakers, a microphone, a light source, or any combination of the aforementioned. It is advantageous for stability that the at least one piece of a second material is located at a fixed position relative to an inner surface of the case whatever the facing/bearing of the apparatus. A corresponding method is also disclosed.

17 Claims, 3 Drawing Sheets

(a)　　　　　　　(b)　　　　　　　(c)

APPARATUS FOR SECURE PLACEMENT ON A FLAT SURFACE AND A METHOD THEREOF

FIELD OF INVENTION

The present invention relates to an apparatus that may be securely placed on a flat surface, wherein the apparatus may relate to one of a web camera, a set of speakers, a microphone, a light source, or a combination of the aforementioned.

BACKGROUND

There are currently several ways of attaching a peripheral device such as a webcam to a display panel. Many of the webcams made by leading peripheral manufacturers like Creative Technology Ltd and Logitech Inc currently have either claw-like stands, or clip-like holders. It should be apparent to a user that devices with such stands/holders would not be equally effective when the webcams are attached to CRT monitors. Webcams attached to CRT monitors using such stands/holders (where possible) without the use of adhesive strips may be prone to being knocked off or may slide off CRT monitors as the webcams are not securely attached to the CRT monitors. Damage to the webcams in such instances may be significant and the cost of repair/replacement to the user may be substantial.

Some manufacturers have designed peripherals for use with specific models of PCs and notebooks, such that there are specific means used to mount/fasten these specific peripherals. However, this greatly reduces the choice of peripheral devices available to the user.

In this regard, there exists a need for peripheral products that can be attached securely to both display panels and CRT monitors without much hassle.

SUMMARY

There is provided an apparatus for secure placement on a substantially flat surface. The apparatus includes a case; at least one support piece located on the substantially flat surface for placement of the case, the support piece including at least one piece of a first material; and at least one piece of a second material located within the case. The case rotates about an axis when a facing/bearing of the apparatus is changed. The axis may be either horizontal or vertical. Preferably, at least one of the first material and the second material is a magnet for magnetic attraction between the at least one piece of the first material and the at least one piece of the second material. The apparatus may be a web camera, a set of speakers, a microphone, a light source, or any combination of the aforementioned. It is advantageous for stability that the at least one piece of a second material is located at a fixed position relative to an inner surface of the case whatever the facing/bearing of the apparatus.

It is preferable that the first and second materials are selected from materials like magnet, iron, cobalt, nickel or an alloy including at least one of the aforementioned metals.

Advantageously, the at least one support piece is contoured to conform with an outer surface of the case. It is preferable that the at least one support piece is covered with a layer with a high coefficient of friction. It is advantageous that a base of the at least one support piece shields magnetic flux.

Preferably, the case is of a cross-sectional profile such as, for example, elliptical, cylindrical polygonal, or any combination of the aforementioned.

There is also provided an accessory for attachment to the apparatus, wherein the accessory is for a function selected from the group consisting of: provision of illumination, provision of audio output, provision of audio input, provision of wireless transmission/reception, provision of a mount, and any combination of the aforementioned.

A method for secure placement of an apparatus on a substantially flat surface is provided therein. The method includes positioning at least one support piece on the substantially flat surface, the support piece including at least one piece of a first material; and placing the apparatus on the at least one support piece, the apparatus including at least one piece of a second material. It is preferable that the apparatus rotates about an axis when a facing/bearing of the apparatus is changed and that at least one of the first material and the second material is a magnet for magnetic attraction between the at least one piece of the first material and the at least one piece of the second material. The apparatus may be selected from the group consisting of: a web camera, a set of speakers, a microphone, a light source, and any combination of the aforementioned.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
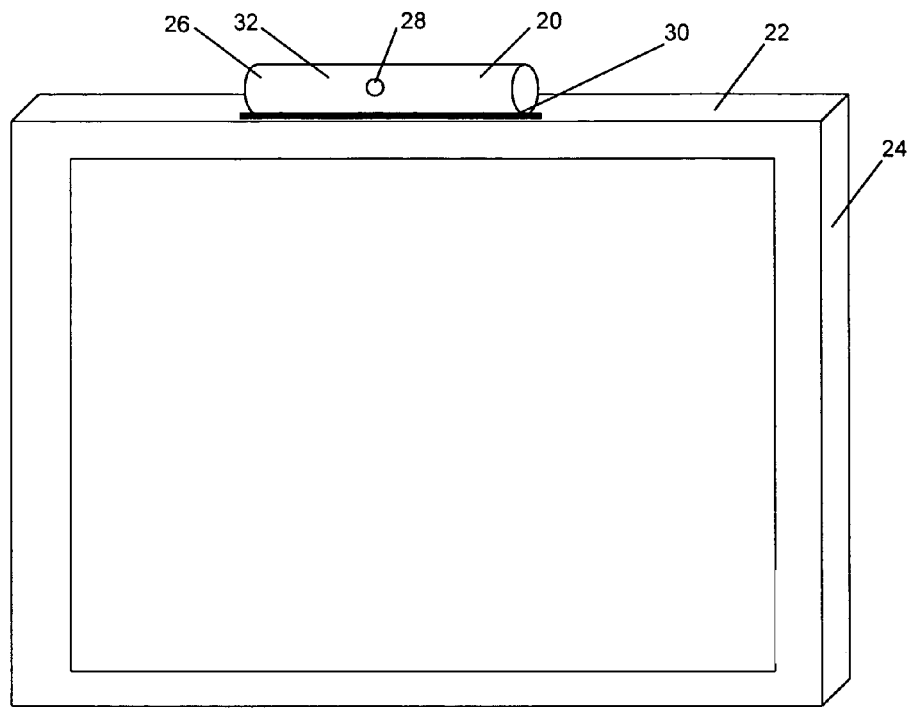
FIG. 1 shows the perspective view of the present invention in a first embodiment.
Figure 2:
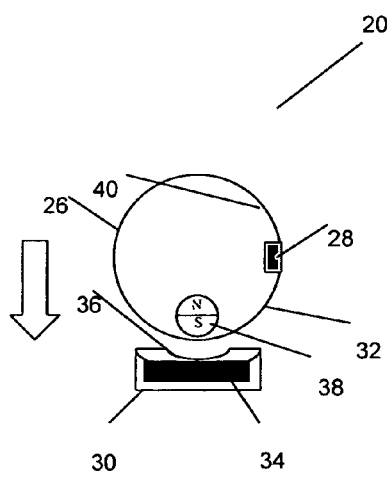
FIG. 2 shows a simplified cross sectional view of the present invention.
Figure 4:
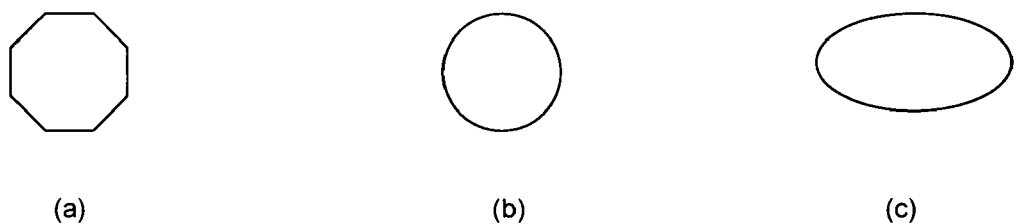
FIG. 4 shows possible cross sectional profiles of the present invention.

Referring to FIG. 1, there is shown an apparatus 20 that may be securely placed on a substantially flat surface. The apparatus 20 is shown being placed on an edge 22 of a flat panel monitor 24. While the apparatus 20 is shown being placed on the flat panel monitor 24, the apparatus 20 may be placed on any substantially flat surface, whether inclined or not. FIG. 2 shows a simplified cross-sectional view of the apparatus 20. Apparatus 20 includes a case 26 that may preferably be made from a material that allows the passage of magnetic flux with minimal distortion/diversion, such as, for example, metals, cardboard and thin sheets of plastic. More importantly, the material used for the case 26 should not block magnetic flux. The reason for this will be apparent in view of the description in the subsequent sections. Referring to FIG. 4, there is shown some possible cross sectional profiles for the case 26. FIG. 4(*a*) shows an octagon, FIG. 4(*b*) shows a circle while FIG. 4(*c*) shows an ellipse. The cross sectional profiles for the case 26 should not be limited to these shapes. The apparatus 20 may be for different types of devices, such as, for example, a web camera (webcam), a set of speakers, a microphone, a light source, or a combination of the aforementioned.

The apparatus 20 in its various guises may generate heat in varying degrees. As such, the case 26 may include fins, vents or a combination of both to allow for cooling of the apparatus 20. The case 26 may be adorned with messages and/or brands and/or logos for decorative and/or marketing reasons. The vents may even be in the shape of logos. In this embodiment, the apparatus 20 is a webcam with lens 28.

The apparatus 20 includes at least one support piece 30. In this embodiment, only one support piece 30 is used for the apparatus 20. The support piece 30 may be located on the substantially flat surface 22 for placement of the case 26 at a location preferred by a user. The support piece 30 may be secured to the substantially flat surface 22 using either adhesives or fasteners. The support piece 30 may be contoured 36 to conform with an outer surface 32 of the case 26. The contouring of the support piece 30 may allow for stable placement of the apparatus 20 regardless of the inclination of the flat surface 22. The support piece 30 may be covered (partially or fully) with a layer made from a material with a high coefficient of friction. The material may be either rubber or a type of polymer. The layer may be laid/coated/placed on the support piece 30 in a location and manner that ensures constant contact between the outer surface 32 of the case 26 and the layer when the apparatus 20 is placed on the support piece 30. The layer may aid in preventing slippage of the apparatus 20 when the apparatus 20 is placed on the support piece 30. The support piece 30 may include at least one piece 34 of a first material. The support piece 30 may be flexible such that it may be located on either flat or curved surfaces.

Similarly, the case 26 may include at least one piece 38 of a second material located within the case 26. The first and second materials may be selected from the group of materials, such as, for example, magnet, iron, cobalt, nickel and an alloy including at least one of the aforementioned metals. Either one of the first and second materials should be a magnet. This enables the other material to be magnetically induced to be attracted to the magnet such that the apparatus 20 magnetically adheres to the support piece 30. It should be noted that magnetism is not induced when both materials are magnets. The magnet may even be an electromagnet in the guise of a coil. In this regard, the magnet may be either within the case 26 or in/part of the support piece 34. The orientation of the magnet either within the case 26 or the support piece 34 would not be an important consideration as the magnet primarily serves to induce a magnetic attraction. The magnet may be of any shape. A base of the support piece 34 may be able to shield magnetic flux. This is especially advantageous in an instance where the support piece 34 is located on a substantially flat surface on a CRT monitor, where it is known that magnetic flux adversely affects the display on the CRT monitor by deflecting electrons in the CRT. This base may allow the apparatus 20 to be usable not just with flat panel displays (like TFT, LCD, OLED and Plasma) but with CRT monitors.

Figure 3:
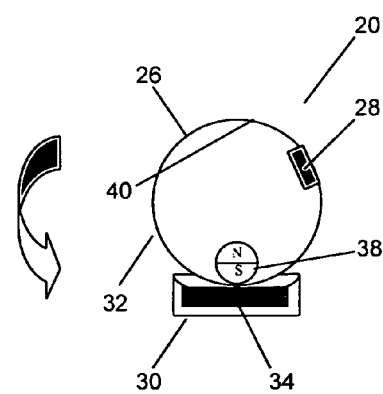
FIG. 3 shows a simplified cross sectional view of the present invention when in use in the first embodiment.

Referring to FIG. 3, there is shown a simplified cross sectional profile of the present invention when in use in the first embodiment. FIG. 3 shows the apparatus 20 (in the form of a webcam) being tilted upwards (the facing of the apparatus 20 is changed vertically). It can be seen that the at least one piece 38 of the second material (in this case a magnet) is located at a fixed position relative to an inner surface 40 of the case 26 whatever the facing of the apparatus 20. It should be appreciated that the case 26 is able to be rotated in a complete revolution about a horizontal axis of the case 26. The at least one piece 38 of the second material remains at a location in the case 26 closest to the at least one support piece 30. The at least one piece 38 of the second material may be located at or in close proximity to the inner surface 40 of the case 26 so that magnetic flux is of a significant amount either exiting or entering the case 26 (exiting in this case) to effect magnetic attraction between the at least one piece 38 of the second material and the at least one piece 34 of a first material. Consequently, the apparatus 20 is magnetically attracted to the support piece 30 and the magnetic attraction enables the apparatus 20 to remain at its new facing. It should be noted that the construction of the apparatus 20 may allow for the at least one piece 38 of the second material to move about (in a limited manner) within the case 26, but the moving around of the at least one piece 38 of the second material should not adversely affect the functionality and operability of the apparatus 20.

Referring to FIG. 4(a), if the case 26 has an octagonal cross sectional profile, each side of the octagon may be a sufficiently stable base for the apparatus 20 on a substantially flat surface, however, having the at least one piece 38 of the second material within such a case 26 would enhance the stability of the apparatus 20 when used with the at least one support piece 30 with at least one piece 34 of a first material due to the magnetic attraction. This would be the common rationale for all usable shapes for the cross sectional profile of the case 26 besides the examples depicted in FIG. 4. It would be conceivable that the case 26 may have a cross sectional profile akin to what is shown in FIG. 4 at the centre of the apparatus 20, but the cross section profile may not be uniform throughout the length of the apparatus 20. This may be for aesthetic, ergonomic design considerations or any other reason. Nonetheless, an apparatus 20 with non-uniform cross sectional shapes throughout its length should not be excluded in this disclosure of the present invention. Different pieces of the support piece 30 with different types of contouring may be used to support different sections of the apparatus 20 with non-uniform cross sectional shapes throughout its length.

Figure 6:
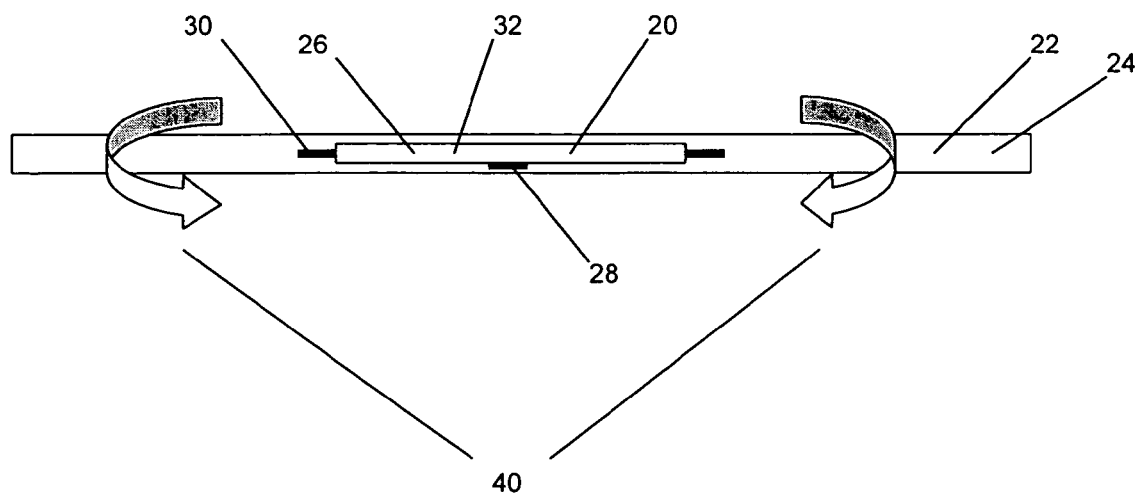
FIG. 6 shows a top view of FIG. 1.

Referring to FIG. 6, there is shown a top view of the apparatus 20 when placed on the edge 22 of the flat panel monitor 24. FIG. 6 is a top view of the setup depicted in FIG. 1. The bearing of the apparatus 20 may also be adjusted in a horizontal plane as denoted in the arrows 40. The support piece 30 may or may not be contoured 36 to conform with an outer surface 32 of the case 26. The apparatus 20 may be turned clockwise or anti-clockwise as required. In this regard, the apparatus 20 is rotating about a vertical axis. It should be appreciated that the apparatus 20 or case 26 is able to be in a complete revolution about the vertical axis of the case 26. It is necessary that the support piece 30 includes at least one piece 34 of a first material so that the apparatus 20 is magnetically anchored to support piece 30. This allows the apparatus 20 to maintain a new bearing.

Figure 7:
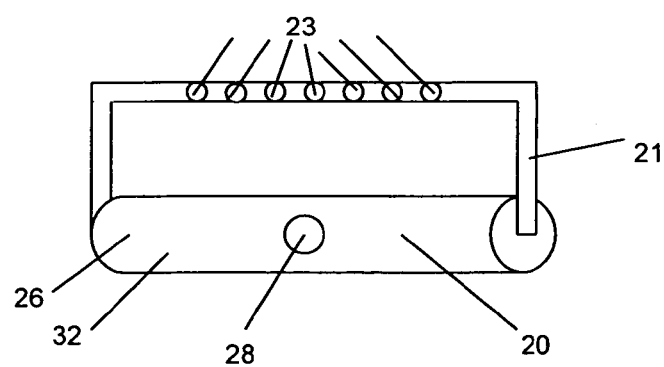
FIG. 7 shows an accessory in use with the present invention in a first embodiment.

Based on the preceding description, it can be seen that the apparatus 20 may be adjusted both vertically (facing) and horizontally (bearing). This enhances the functionality of the apparatus 20 when used in the guise of a web camera (webcam), a set of speakers, a microphone, a light source, or a combination of the aforementioned. The apparatus 20 in its various guises may be used together. A row of the apparatus 20 may be arranged on the edge 22 of the flat panel monitor 24, with the individual functionality of each apparatus 20 complementing each other. For example, the apparatus 20 that is a light source complements the apparatus 20 that is a webcam as lighting is provided to illuminate the user in front of the webcam. It should be noted that multiple functionalities may be incorporated in each apparatus 20, such as a webcam with a light source and a microphone. FIG. 7 also shows an accessory 21 that may be used with the apparatus 20. The accessory 21 may clip onto the ends of the apparatus 20. The accessory 21 includes a row of light sources 23, such as, for example, LEDs, bulbs, fluorescent tubes and the like. The accessory 21 need not be limited to providing illumination. The accessory 21 may be a microphone, a speaker, a wireless transceiver, a holder for zoom lenses and so forth.

The apparatus 20 may include a portable stand where the support piece 30 may be located. This may be suitable for users who do not wish to adhere the support piece 30 directly to their flat panel displays.

Figure 5:
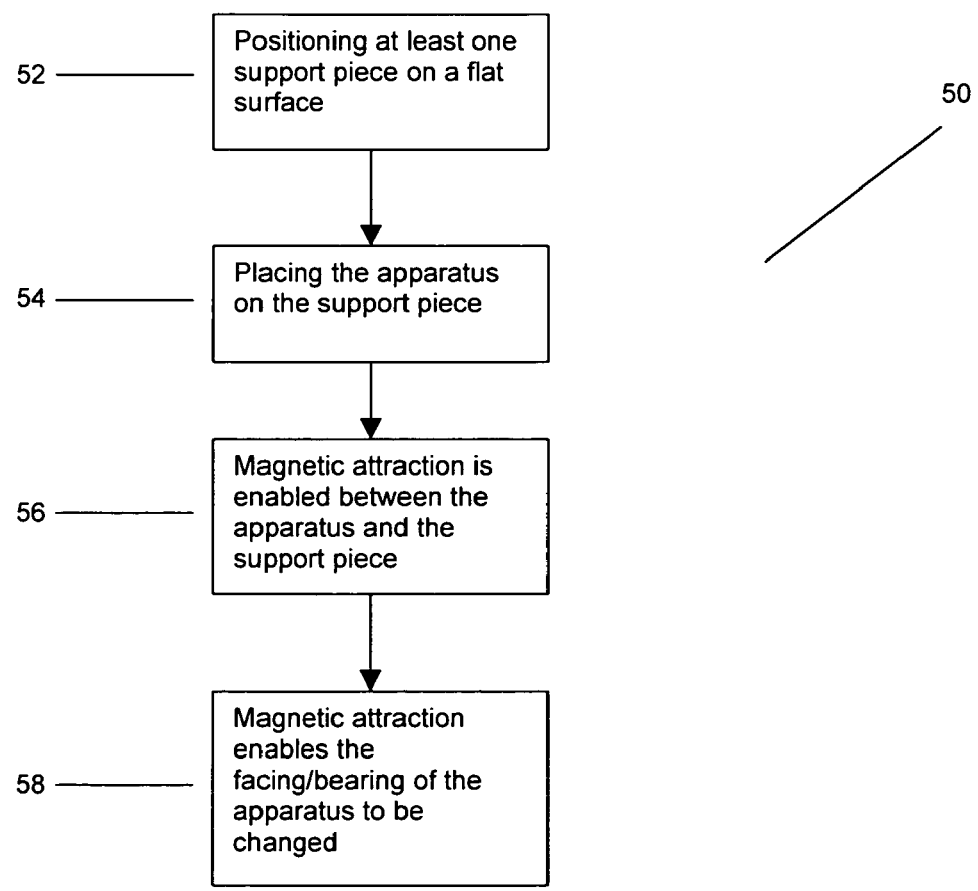
FIG. 5 a flow chart for the method of the present invention.

In another aspect of the present invention, there is also disclosed a method for secure placement of an apparatus on a substantially flat surface, whether inclined or not. FIG. 5 depicts the method 50 in the form of a flow chart. The apparatus may be, for example, a web camera (webcam), a set of speakers, a microphone, a light source, or a combination of the aforementioned. The apparatus may be of a cross-sectional profile such as, for example, elliptical, cylindrical, polygonal or a combination of the aforementioned.

Firstly, at least one support piece may be positioned on the substantially flat surface (52). The at least one support piece 30 may be secured to the substantially flat surface 22 using adhesives or fasteners. For reasons mentioned earlier in the description, the support piece may include at least one piece of a first material. The support piece may be suitably contoured to conform with a form factor of the apparatus. The contouring of the support piece may allow for stable placement of the apparatus 20 regardless of the inclination of the flat surface. The support piece may be covered (partially or fully) with a layer with high coefficient of friction. The layer may be made from either rubber or a type of polymer. The layer may be laid/coated/placed on the support piece in a manner that ensures constant contact between the apparatus and the layer when the apparatus is placed on the support piece. The layer may aid in preventing slippage of the apparatus when the apparatus is placed on the support piece.

Subsequently, the apparatus may be placed on the at least one support piece (54), the apparatus including at least one piece of a second material located within its cavity. The first and second materials may be selected from the group of materials, such as, for example, magnet, iron, cobalt, nickel and an alloy including at least one of the aforementioned metals. Either one of the first and second materials should be a magnet. This enables the other material to be attracted to the magnet such that the apparatus magnetically adheres to the support piece. The magnet may even be an electromagnet in the guise of a coil. In this regard, the magnet may be either within the apparatus or in/part of the support piece. The orientation of the magnet either within the apparatus or the support piece would not be an important consideration as the magnet primarily serves to induce a magnetic attraction (56) between the apparatus and the support piece. The magnet may be of any shape.

The magnetic attraction mentioned in the previous paragraph allows the facing/bearing of the apparatus to be changed and kept at the new facing/bearing in the manner (58) as described earlier. However the facing/bearing of the apparatus is changed, the at least one piece of the second material is located at a fixed position relative to a cavity of the apparatus at a location in the cavity closest to the at least one support piece. This is so that magnetic flux is of a significant amount either exiting or entering the apparatus. The construction of the apparatus may allow for the movement of the at least one piece of the second material (in a limited manner) within the apparatus, but the moving around of the at least one piece of the second material should not adversely affect the functionality and operability of the apparatus.

Whilst there has been described in the foregoing description preferred embodiments of the present invention, it will be understood by those skilled in the technology concerned that many variations or modifications in details of design or construction may be made without departing from the present invention.

The invention claimed is
1. A computer peripheral apparatus for secure placement on a substantially flat surface, including:
   a case;
   at least one support piece adapted for placement on the substantially flat surface and for receiving placement of the case;
   at least one piece of a first material located within the support piece; and
   at least one piece of a second material located within the case;
   wherein the case is configured to allow movement of the second material relative to the case, the movement allowing the second material to remain at a location within the case closest to the at least one piece of the first material;
   wherein the case is configured to rotate in a complete revolution about either a horizontal axis of the case relative to the at least one support piece when varying a facing/bearing of the case; and
   wherein at least one of the first material and the second material is a magnet for magnetic attraction between the at least one piece of the first material and the at least one piece of the second material.

2. The apparatus of claim 1, wherein the apparatus is selected from the group consisting of: a web camera, a set of speakers, a microphone, a light source, and any combination of the aforementioned.

3. The apparatus of claim 1, wherein the first and second materials are selected from the group consisting of: magnet, iron, cobalt, nickel and an alloy including at least one of the aforementioned metals.

4. The apparatus of claim 1, wherein the at least one support piece is contoured to conform with an outer surface of the case.

5. The apparatus of claim 1, wherein the at least one support piece is covered with a layer with a high coefficient of friction.

6. The apparatus of claim 1, wherein the case is of a cross-sectional profile selected from the group consisting of: elliptical, circular, polygonal, and any combination of the aforementioned.

7. The apparatus of claim 1, wherein a base of the at least one support piece shields magnetic flux.

8. The computer peripheral apparatus of claim 1 further comprising an accessory for attachment to the apparatus, wherein the accessory is configured to perform a function selected from the group consisting of: provision of illumination, provision of audio output, provision of audio input, provision of wireless transmission/reception, provision of a mount, and any combination of the aforementioned.

9. The apparatus of claim 1 wherein the apparatus is a webcam and the second material is a magnet and wherein the magnet moves within the case of the webcam when the webcam is tilted from a first position to a second position in order to remain in magnetic proximity with the at least one piece of the first material located in the support piece.

10. A method for secure placement of a computer peripheral apparatus on a substantially flat surface, including:

positioning at least one support piece on the substantially flat surface, the support piece including at least one piece of a first material; and placing a case of the apparatus on the at least one support piece, the case including at least one piece of a second material and the case being configured to allow movement of the second material relative to the case, the movement allowing the second material to remain at a location within the case closest to the at least one piece of the first material;

wherein the case is configured to rotate in a complete revolution about either a horizontal axis or vertical axis of the case relative to the at least one support piece when a facing/bearing of the case is varied; and wherein at least one of the first material and the second material is a magnet for magnetic attraction between the at least one piece of the first material and the at least one piece of the second material.

11. The method of claim 10, wherein the apparatus is selected from the group consisting of: a web camera, a set of speakers, a microphone, a light source, and any combination of the aforementioned.

12. The method of claim 10, wherein the first and second materials are selected from the group consisting of: magnet, iron, cobalt, nickel and an alloy including at least one of the aforementioned metals.

13. The method of claim 10, wherein the at least one support piece is contoured to receive the apparatus case.

14. The method of claim 10, wherein the at least one support piece is covered with a layer with a high coefficient of friction.

15. The method of claim 10, wherein the apparatus case is of a cross-sectional profile selected from the group consisting of: elliptical, circular, polygonal, and any combination of the aforementioned.

16. The method of claim 10, wherein a base of the at least one support piece shields magnetic flux.

17. A computer peripheral apparatus for secure placement on a substantially flat surface, including:
   a case;
   at least one support piece located on the substantially flat surface for placement of the case, the support piece including at least one piece of a first material; and
   at least one piece of a second material located within the case;
   wherein the case is configured to rotate in a complete revolution about either a horizontal axis or vertical axis of the case relative to the at least one support piece when a facing/bearing of the case is varied;
   wherein the second material maintains a position within the case that is closest to the support piece when a facing/bearing of the case is varied; and
   wherein at least one of the first material and the second material is a magnet for magnetic attraction between the at least one piece of the first material and the at least one piece of the second material.

* * * * *